US008481160B2

(12) United States Patent
Dooley et al.

(10) Patent No.: US 8,481,160 B2
(45) Date of Patent: *Jul. 9, 2013

(54) BIMODAL AND MULTIMODAL PLANT BIOMASS PARTICLE MIXTURES

(75) Inventors: James H. Dooley, Federal Way, WA (US); David N. Lanning, Federal Way, WA (US)

(73) Assignee: Forest Concepts, LLC, Auburn, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,312

(22) Filed: Aug. 24, 2012

(65) Prior Publication Data

US 2012/0308767 A1  Dec. 6, 2012

Related U.S. Application Data

(63) Continuation-in-part of application No. PCT/US2011/033584, filed on Apr. 22, 2011, which is a continuation-in-part of application No. 12/966,198, filed on Dec. 13, 2010, now Pat. No. 8,039,106, which is a continuation of application No. 12/907,526, filed on Oct. 19, 2010, now Pat. No. 8,034,449.

(60) Provisional application No. 61/343,005, filed on Apr. 22, 2010, provisional application No. 61/654,617, filed on Jun. 1, 2012.

(51) Int. Cl.
*B32B 5/16* (2006.01)

(52) U.S. Cl.
USPC .............. 428/402; 428/15; 428/17; 428/18; 144/373; 47/9

(58) Field of Classification Search
USPC ............. 428/402, 15, 17, 18; 144/373; 47/9
See application file for complete search history.

(56) References Cited

U.S. PATENT DOCUMENTS

| | | | |
|---|---|---|---|
| 1,867 A | 11/1840 | Winans et al. | |
| 215,162 A | 5/1879 | Rice | |
| 257,977 A | 5/1882 | Rice | |
| 279,019 A | 6/1883 | Rice | |
| 280,952 A | 7/1883 | Rice | |
| 286,637 A | 10/1883 | Rice | |
| 295,944 A | 4/1884 | Rice | |
| 305,227 A | 9/1884 | Rice | |
| 1,477,502 A | 12/1923 | Killick | |
| 1,980,193 A | 11/1934 | Finegan | |
| 2,655,189 A | 10/1953 | Clark | |
| 2,689,092 A | 9/1954 | Clark et al. | |
| 2,773,789 A | 12/1956 | Clark | |
| 2,776,686 A | 1/1957 | Clark | |
| 3,216,470 A | 11/1965 | Nilsson | |
| 3,219,076 A | 11/1965 | Logan et al. | |
| 3,396,069 A * | 8/1968 | Logan et al. | 428/155 |
| 3,415,297 A | 12/1968 | Yock | |
| 3,773,267 A | 11/1973 | Schafer et al. | |
| 3,797,765 A | 3/1974 | Samuels | |
| 3,913,643 A | 10/1975 | Lambert | |
| 4,364,423 A | 12/1982 | Schilling | |
| 4,558,725 A | 12/1985 | Veneziale | |
| 4,589,357 A | 5/1986 | Lincoln et al. | |
| 4,610,928 A | 9/1986 | Arasmith | |
| 4,681,146 A | 7/1987 | Liska et al. | |
| 5,029,625 A | 7/1991 | Diemer | |
| 5,152,251 A | 10/1992 | Aukeman et al. | |
| 5,199,476 A | 4/1993 | Hoden | |
| 5,215,135 A | 6/1993 | Coakley et al. | |
| 5,505,238 A | 4/1996 | Fujii et al. | |
| 5,533,684 A | 7/1996 | Bielgus | |
| 5,842,507 A | 12/1998 | Fellman et al. | |
| 6,267,164 B1 | 7/2001 | Carpenter | |
| 6,422,494 B1 | 7/2002 | Reeves et al. | |
| 6,543,497 B2 | 4/2003 | Dietz | |
| 6,575,066 B2 | 6/2003 | Arasmith | |
| 6,729,068 B2 | 5/2004 | Dooley et al. | |
| 7,291,244 B2 | 11/2007 | DeZutter et al. | |
| 7,998,580 B2 | 8/2011 | Brandenburg | |
| 8,034,449 B1 * | 10/2011 | Dooley et al. | 428/402 |
| 8,039,106 B1 * | 10/2011 | Dooley et al. | 428/402 |
| 8,158,256 B2 * | 4/2012 | Dooley et al. | 428/402 |
| 8,177,867 B2 | 5/2012 | Joseph et al. | |
| 2004/0035048 A1 | 2/2004 | Dooley et al. | |
| 2007/0045456 A1 | 3/2007 | Medoff | |
| 2009/0145563 A1 | 6/2009 | Jarck | |

FOREIGN PATENT DOCUMENTS

| | | |
|---|---|---|
| CA | 773835 | 12/1967 |
| DE | 102007014293 A1 | 10/2008 |
| EP | 0394890 A2 | 4/1990 |
| EP | 1525965 A2 | 4/2005 |
| EP | 2045057 A1 | 4/2009 |
| JP | 62030190 A2 | 9/1987 |

(Continued)

OTHER PUBLICATIONS

Technical Specification SIS-CEN/TS 15103.2006, Solid Biofuels: Methods for determination of bulk density, Mar. 2006.

(Continued)

*Primary Examiner* — Leszek Kiliman

(74) *Attorney, Agent, or Firm* — Thomas F. Broderick

(57) ABSTRACT

An industrial feedstock of plant biomass particles having fibers aligned in a grain, wherein the particles are individually characterized by a length dimension (L) aligned substantially parallel to the grain, a width dimension (W) normal to L and aligned cross grain, and a height dimension (H) normal to W and L, wherein the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces, and wherein the particles in the feedstock are collectively characterized by having a bimodal or multimodal size distribution.

10 Claims, 4 Drawing Sheets

FOREIGN PATENT DOCUMENTS

WO    9717177    5/1997
WO    9902766    1/1999

OTHER PUBLICATIONS

International Search Report, dated Aug. 30, 2011, in International application No. PCT/US2011/033584.

Buckmaster, D. R., Assessing activity access of forage or biomass, Transactions of the ASABE 51(6):1879-1884, 2008.
Lanning, D., et al., Mode of failure model for cutting solid section biomass, ASABE Paper No. 085111, 2008.
Janse, A.M.C., et al., Modeling of flash pyrolysis of a single wood particle, Chemical Engineering and Processing, 39:329-252, 2000.

* cited by examiner

US 8,481,160 B2

BIMODAL AND MULTIMODAL PLANT BIOMASS PARTICLE MIXTURES

STATEMENT OF GOVERNMENT LICENSE RIGHTS

This invention was made with government support by the Small Business Innovation Research program of the U.S. Department of Energy, Contract SC0002291. The United States government has certain rights in the invention.

FIELD OF THE INVENTION

Our invention relates to plant biomass particle mixtures that contain at least two particle sizes, a larger mode and a smaller mode.

BACKGROUND OF THE INVENTION

As used herein the term "monomodal" refers to an industrial feedstock that contains substantially one size of particle, whereas a "bimodal" feedstock contains two sizes of particles as characterized by exhibiting a continuous probability distribution having two different modes (that is, two relatively distinct peaks identifiable by size screening). "Multimodal" indicates exhibiting a multiplicity (more than two) of such sizes or peaks.

It is well known in the art that bimodal and multimodal mixtures of particles may have certain useful industrial properties. Representative examples follow.

U.S. Pat. No. 8,177,867 discloses coal-in-water slurries having bimodal and multimodal particle size distributions.

U.S. Pat. No. 6,729,068 (Dooley et al.) discloses an engineered wood-based mulch product composed of a bimodal or multimodal blend of geometrically regular wood elements.

U.S. Pat. No. 4,589,357 discloses a bimodal biomass fuel source made from hog fuel that is capable of self-sustaining combustion in an air suspension fired burner.

Japanese Patent Publication No. 62030190 discloses a concentrated coal-water slurry having a bimodal particle diameter distribution.

International Publication No. WO 99/02766 discloses fiber matting having a bimodal fiber length distribution intended for the smooth surface coating of plywood boards.

U.S. Pat. No. 6,422,494 discloses a method of increasing the bulk density of mineral materials by sizing such materials into selective bimodal and multimodal size distributions.

Such prior art techniques often involve screening comminuted materials and combining particular size fractions into bimodal or multimodal mixtures.

SUMMARY OF THE INVENTION

Herein we describe a new class of plant biomass feedstock particles characterized by consistent piece sizes and shapes, high skeletal surface areas, and good flow properties. This constellation of characteristics makes the feedstock particles particularly advantageous for combining into bimodal or multimodal mixtures.

The subject feedstock particles of plant biomass material having fibers aligned in a grain are individually characterized by a length dimension (L) aligned substantially parallel to the grain, a width dimension (W) normal to L and aligned cross grain, and a height dimension (H) normal to W and L, wherein the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces, and the particles in the feedstock are collectively characterized by having a bimodal or multimodal size distribution. The plant biomass material(s) in such blended feedstocks may be selected from among wood, particularly wood veneer, agricultural crop residues, plantation grasses, hemp, bagasse, and/or bamboo.

The particles may be characterized as having a bimodal or multimodal size distribution by the following protocol: (1) drying a random 1000 g sample of the particles to constant weight at 110° F.; (2) pouring 400 g of the dried particles into a stacked screen assembly consisting of in contiguous size-ordered array: a top 1-inch screen having 25 mm nominal sieve openings, a ½-inch screen having 12.5 mm nominal sieve openings, a ¼-inch screen having 6.3 mm nominal sieve openings, a No. 4 screen having 4.75 mm nominal sieve openings, a ⅛-inch screen having 3.18 mm nominal sieve openings, a No. 10 screen having 2.0 mm nominal sieve openings, a No. 20 screen having 0.85 mm nominal sieve openings, a No. 35 screen having a 0.5 mm nominal sieve openings, and a bottom pan; (3) shaking the stacked screen assembly for 10 minutes on a motorized tapping sieve shaker; (4) weighing the particles that are retained on each of the screens; (5) preparing a graphical representation of the relationship between screen size on the x-axis and retained weight per screen size on the y-axis; (6) and, determining that the particles are characterized by having a bimodal or multimodal size distribution if the graphical representation has two or more relatively distinct peaks.

DETAILED DESCRIPTION OF THE PREFERRED EMBODIMENT

Figure 1:
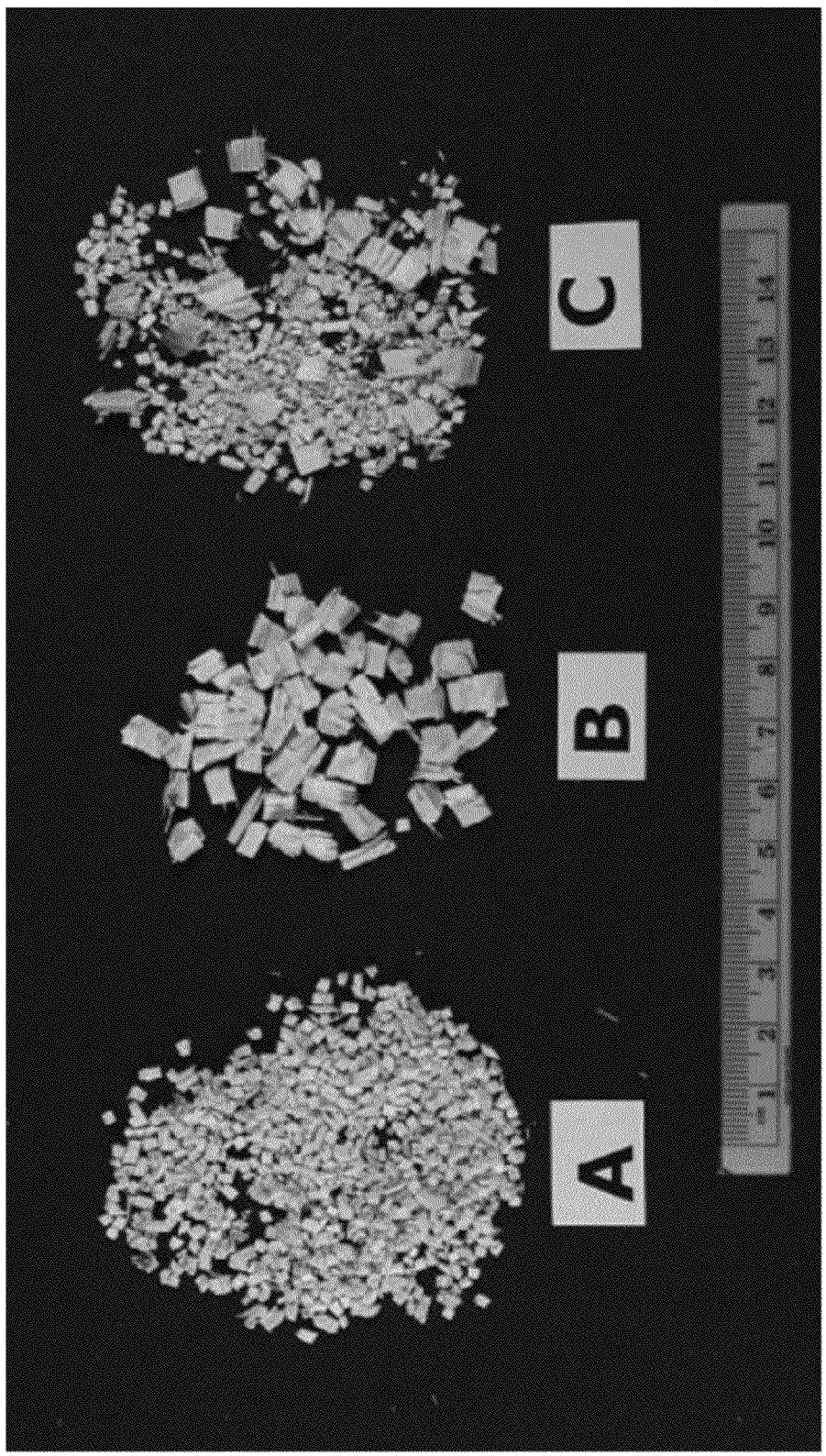
FIG. 1 is a photograph of one-gram samples of three wood materials described in the Examples: A, nominal 2 mm×2 mm hybrid Poplar particles; B, nominal 4 mm×4 mm hybrid Poplar particles; and C, a bimodal mixture by equal weight of the 2 mm and 4 mm hybrid Poplar particles.

We have applied engineering design principles to develop a new class of plant biomass feedstock particles with unusually large surface area to volume ratios that can be manufactured in remarkably uniform sizes using low-energy comminution techniques. The particles exhibit a disrupted grain structure with prominent end and some surface checks that greatly enhance their skeletal surface area as compared to their envelope surface area. Representative wood feedstock particles are shown in FIGS. 1A, B, and C, which indicate the consistent piece size and shape uniformity of the subject particles.

The term "plant biomass" as used herein refers generally to encompass all plant materials harvested or collected for use as industrial including bioenergy/biorefinery feedstocks, including woody biomass, hardwoods and softwoods, energy crops like switchgrass, miscanthus, and giant reed grass, hemp, bagasse, bamboo, and agricultural crop residues, particularly corn stover.

The term "grain" as used herein refers generally to the arrangement and longitudinally arrayed direction of fibers within plant biomass materials. "Grain direction" is the orientation of the long axis of the dominant fibers in a piece of plant biomass material.

The terms "checks" or "checking" as used herein refer to lengthwise separation and opening between plant fibers in a biomass feedstock particle. "Surface checking" may occur on the lengthwise surfaces a particle (particularly on the L×W surfaces); and "end checking" occurs on the cross-grain ends (W×H) of a particle.

The term "extent" as used herein refers to an outermost edge on a particle's surface taken along any one of the herein described L, W, and H dimensions (that is, either parallel or normal to the grain direction, as appropriate); and "extent dimension" refers to the longest straight line spanning points normal to the two extent edges along that dimension. "Extent volume" refers to a parallelepiped figure that encompasses a particle's three extent dimensions.

The term "skeletal surface area" as used herein refers to the total surface area of a biomass feedstock particle, including the surface area within open pores formed by checking between plant fibers. In contrast, "envelope surface area" refers to the surface area of a virtual envelope encompassing the outer dimensions the particle, which for discussion purposes can be roughly approximated to encompass the particle's extent volume.

The new class of plant biomass feedstock particles described herein can be readily optimized in size and shape for combination into bimodal and multimodal particle mixtures. A representative bimodal particle mixture is shown in FIG. 1C and described in the Examples.

Each modal particle in the subject blended feedstocks is intended to have a specified and substantially uniform length (L) along the grain direction, a width (W) tangential to the growth rings (in wood) and/or normal to the grain direction, and a height (H) (termed thickness in the case of veneer) radial to the growth rings and/or normal to the W and L dimensions.

We have found it very convenient to use wood veneer from the rotary lathe process as a raw material. Peeled veneer from a rotary lathe naturally has a thickness that is oriented with the growth rings and can be controlled by lathe adjustments. Moreover, within the typical range of veneer thicknesses, the veneer contains very few growth rings, all of which are parallel to or at very shallow angle to the top and bottom surfaces of the sheet. In our application, we specify the veneer thickness to match the desired wood particle height (H) to the specifications for particular end-use applications.

The veneer may be processed into particles directly from a veneer lathe, or from stacks of veneer sheets produced by a veneer lathe. Plant biomass materials that are too small in diameter or otherwise not suitable for the rotary veneer process can be sliced to pre-selected thickness by conventional processes. Our preferred manufacturing method is to feed the veneer sheet or sliced materials into a rotary bypass shear with the grain direction oriented across and preferably at a right angle to the feed direction through the machine's processing head, that is, parallel to the shearing faces.

Figure 2:
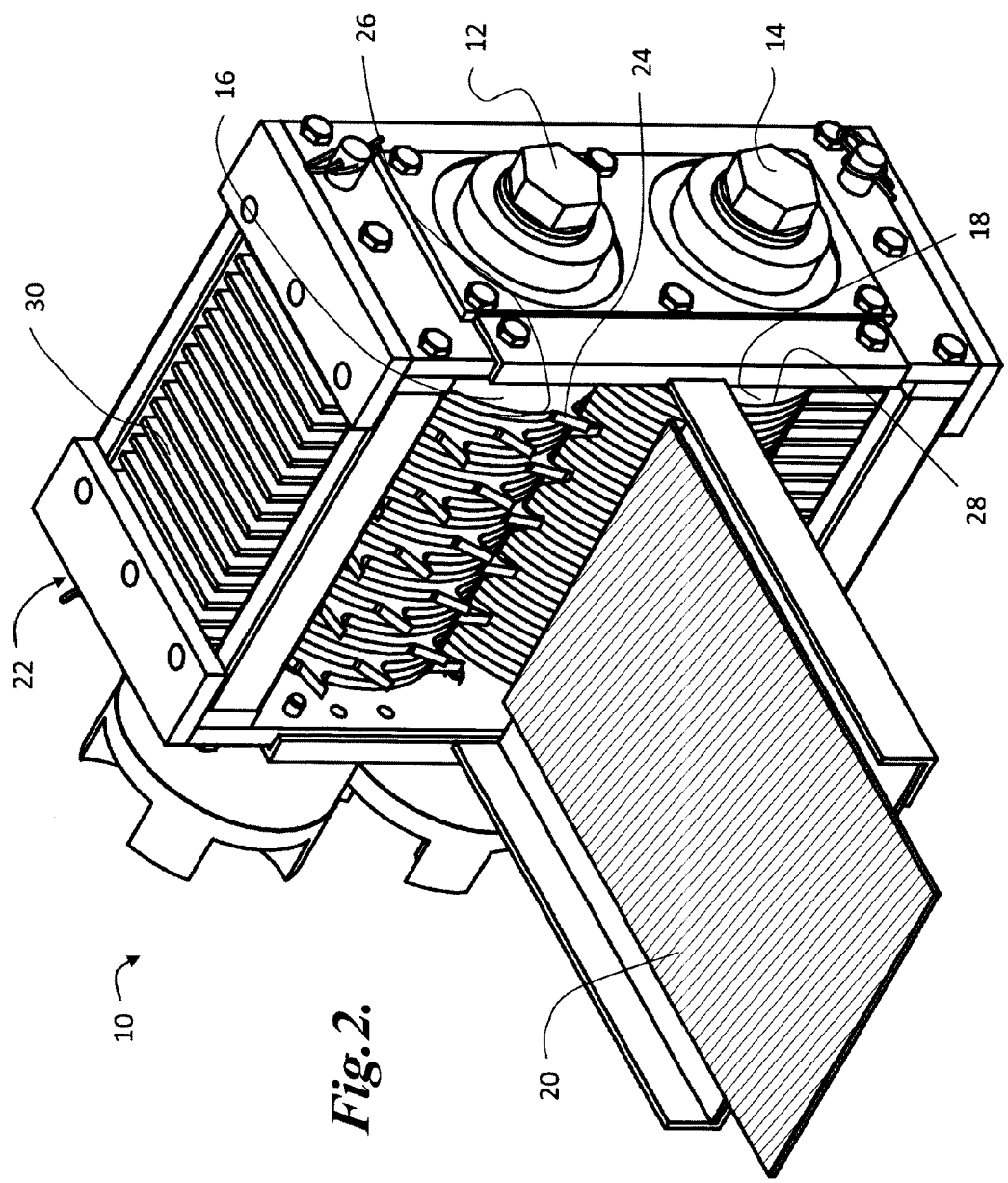
FIG. 2 is a perspective view of the prototype rotary bypass shear machine that was used to produce the wood particles shown in FIG. 1.

The rotary bypass shear that we designed for manufacture of wood feedstock particles is a shown in FIG. 2. This prototype machine 10 is much like a paper shredder and includes parallel shafts 12, 14, each of which contains a plurality of cutting disks 16, 18. The disks 16, 18 on each shaft 12, 14 are separated by smaller diameter spacers (not shown) that are the same width or greater by 0.1 mm thick than the cutting disks 16, 18. The cutting disks 16, 18 may be smooth 18, knurled (not shown), and/or toothed 16 to improve the feeding of veneer sheets 20 through the processing head 22. Each upper cutting disk 16 in our rotary bypass shear 10 contains five equally spaced teeth 24 that extend 6 mm above the cutting surface 26. The spacing of the two parallel shafts 12, 14 is slightly less than the diameter of the cutting disks 16, 18 to create a shearing interface. In our machine 10, the cutting disks 16, 18 are approximately 105 mm diameter and the shearing overlap is approximately 3 mm.

This rotary bypass shear machine 10 used for demonstration of the manufacturing process operates at an infeed speed of one meter per second (200 feet per minute). The feed rate has been demonstrated to produce similar particles at infeed speeds up to 2.5 meters per second (500 feet per minute).

The width of the cutting disks 16, 18 establishes the length (L) of the particles produced since the veneer 20 is sheared at each edge 28 of the cutters 16, 18 and the veneer 20 is oriented with the fiber grain direction parallel to the cutter shafts 12, 14 and shearing faces of the cutter disks 16, 18. Thus, wood particles from our process are of much more uniform length than are particles from shredders, hammer mills and grinders which have a broad range of random lengths. The desired and predetermined length of particles is set into the rotary bypass shear machine 10 by either installing cutters 16, 18 having widths equal to the desired output particle length or by stacking assorted thinner cutting disks 16, 18 to the appropriate cumulative cutter width.

Fixed clearing plates 30 ride on the rotating spacer disks to ensure that any particles that are trapped between the cutting disks 16, 18 are dislodged and ejected from the processing head 20.

We have found that the wood particles leaving the rotary bypass shear machine 10 are broken (or crumbled) into short widths (W) due to induced internal tensile stress failures. Thus the resulting particles are of generally uniform length (L) along the wood grain, as determined by the selected width of the cutters 16, 18, and of a uniform thickness (H, when made from veneer), but vary somewhat in width (W) principally associated with the microstructure and natural growth properties of the raw material species. Most importantly, frictional and Poisson forces that develop as the biomass material 20 is sheared across the grain at the cutter edges 28 tend to create end checking that greatly increases the skeletal surface areas of the particles. Substantial surface checking between longitudinally arrayed fibers further elaborates the L×W surfaces when the length to height ratio (L/H) is 4:1 or less, and particularly 2:1 or less.

The output of the rotary bypass shear 10 may be used as is for some end-uses such as soil amendment, biochar, activated carbon, and industrial fiber production. However, many end-uses will benefit if the particles are screened into more narrow size fractions that are optimal for end-use applications requiring improved flowability and processing uniformity. In that case, an appropriate stack of vibratory screens or a tubular trommel screen with progressive openings can be used to remove particles larger or smaller than desired. In the event that the feedstock particles are to be stored for an extended period or are to be fed into a conversion process that requires very dry feedstock, the particles may be dried prior to storage, packing or delivery to an end user.

We have used this prototype machine 10 to make feedstock particles in various lengths from a variety of plant biomass materials, including: peeled softwood and hardwood veneers; sawed softwood and hardwood veneers; softwood and hardwood branches and limbs crushed to a predetermined uniform height or maximum diameter; cross-grain oriented wood chips and hog fuel; corn stover; switchgrass; and bamboo. The L×W surfaces of peeled veneer particles generally retain the tight-side and loose-side characteristics of the raw material. Crushed wood and fibrous biomass mats are also suitable starting materials, provided that all such biomass materials are aligned across the cutters 16, 18, that is, with the shearing faces substantially parallel to the grain direction, and preferably within 10° and at least within 30° parallel to the grain direction.

We currently consider the following size ranges as particularly useful biomass feedstocks: For each monomeric component, H should not exceed a maximum from 1 to 16 mm, in which case W is between 1 mm and 1.5× the maximum H, and L is between 0.5 and 20× the maximum H; or, preferably, L is between 4 and 70 mm, and each of W and H is equal to or less than L.

To increase surface area, L/H of a monomeric should be 4:1 or less, and preferably 2:1 or less, in which case the top and bottom surfaces are increasingly characterized by surface checking between longitudinally arrayed fibers.

For flowability and high surface area to volume ratios, the L, W, and H dimensions are selected so that at least 80% of the size-blended particles in a feedstock pass through a ½ inch screen having a 12.5 mm nominal sieve opening but are retained by a No. 35 screen having a 0.5 mm nominal sieve opening.

Suitable testing screens and screening assemblies for characterizing the subject biomass particles in such size ranges are available from the well-known Gilson Company, Inc., Lewis Center, Ohio, US (www.globalgilson.com). In a representative protocol, approximately 400 g of the subject particles (specifically, the output of machine 10 with ⅜"-wide cutters and ⅙" conifer veneer) were poured into stacked ½", ⅜", ¼", No. 4, No. 8, No. 10, and Pan screens; and the stacked screen assembly was roto-tapped for 5 minutes on a Gilson® Sieve Screen Model No. SS-12R. The particles retained on each screen were then weighed. Table 1 summarizes the resulting data.

TABLE 1

| | Screen size | | | | | |
|---|---|---|---|---|---|---|
| | ½" | ⅜" | ¼" | No. 4 | No. 8 | No. 10 | Pan |
| % retained | 0 | 0.3 | 1.9 | 46.2 | 40.7 | 3.5 | 7.4 |

These data show a much narrower size distribution profile than is typically produced by traditional high-energy comminution machinery.

Thus, the invention provides plant biomass particles characterized by consistent piece size as well as shape uniformity, obtainable by cross-grain shearing a plant biomass material of selected thickness by a selected distance in the grain direction. Our rotary bypass shear process greatly increases the skeletal surface areas of the particles as well, by inducing frictional and Poisson forces that tend to create end checking as the biomass material is sheared across the grain. The resulting cross-grain sheared plant biomass particles are useful for combining into bimodal or multimodal mixtures.

Examples

Physical bulk density is an important parameter for fuel deliveries on volume basis—as it allows specification of the required storage or transportation volumes—and together with the net calorific value it determines the energy bulk density. In the following experiments, we determined and compared the bulk densities of monomodal and bimodal mixtures of the subject biomass particles.

Materials

Wood particles of the present invention were manufactured in the above described machine 10, using either 3/16" or 1/16" wide cutters, from green hybrid Poplar veneer of thicknesses corresponding to the cutter widths. Preliminary size screening removed over- and under-sized materials. The resulting particles were dried to ambient conditions.

Two bimodal particle mixtures were prepared. A first bimodal mixture based on equal weight was prepared by admixing 400 g of the nominal 2 mm particles with 400 g of the nominal 4 mm particles. A second bimodal mixture based on equal volume was prepared by admixing 4.6 liters of the nominal 2 mm particles (which weighted 586 g) with 4.6 liters of the nominal 4 mm particles (588 g).

(It should be understood that, alternatively, an admixture of 2×2 mm and 2×4 mm particles can be produced directly from 2 mm veneer by stacking the shafts 12, 14 of machine 10 with a desired ratio of alternating pairs of 2 mm- and 4 mm-wide cutting discs 16, 18.)

Wood chips were produced from green hybrid Poplar tops (up to 6" diameter) with a rented tow-behind chipper. The resulting chips were ambient dried but not sorted by size.

The wood particle and chip materials were stored in airtight plastic bags.

Methods

Prior to bulk density determination, the wood materials were characterized by size screening as follows. Approximately 400 g of the particles were poured into stacked ⅜", No. 4, ⅛", No. 10, No. 16, No. 20, No. 35, No. 50, No. 100, and Pan screens; and the stacked screen assembly was roto-tapped for 10 minutes on a Gilson® Sieve Screen Model No. SS-12R. The wood chips were characterized by size similarly but with a larger screen stack: 3", 1.5", 1", ½", ¼", ⅛", No. 16, and Pan. The weight of material retained on each screen is shown in Table 2.

TABLE 2

| | | Weight (g) of material retained on each screen | | | |
|---|---|---|---|---|---|
| Sieve | mm | 2 × 2 particles | 4 × 4 particles | Bimodal, wt | Bimodal, vol | Wood chips |
| 3" | 75.0 | | | | | 0 |
| 1.5" | 37.5 | | | | | 17.3 |
| 1" | 25.0 | | | | | 16.6 |
| ½" | 12.5 | | | | | 63 |
| ⅜" | 9.53 | 0 | 0.3 | 0 | 0.1 | |
| ¼" | 6.3 | | | | | 182.3 |
| #4 | 4.75 | 0 | 319.6 | 134.1 | 161.5 | |
| ⅛" | 3.18 | 0.6 | 82.3 | 37.1 | 43.2 | 94.6 |
| #10 | 2.0 | 199.9 | 6.9 | 98.7 | 93.7 | |
| #16 | 1.18 | 177.1 | 2 | 95.9 | 84.7 | 25.7 |
| #20 | 0.84 | 14.9 | 0.5 | 19.7 | 15.7 | |
| #35 | 0.5 | 4.6 | 0.1 | 13.5 | 10.7 | |
| #50 | 0.3 | 1.9 | 0.1 | 3.9 | 2.6 | |
| #100 | 0.15 | 1.3 | 0 | 1.3 | 0.8 | |
| Pan | 0 | 0.4 | 0 | 0.3 | 0.3 | 3.7 |

Figure 3:
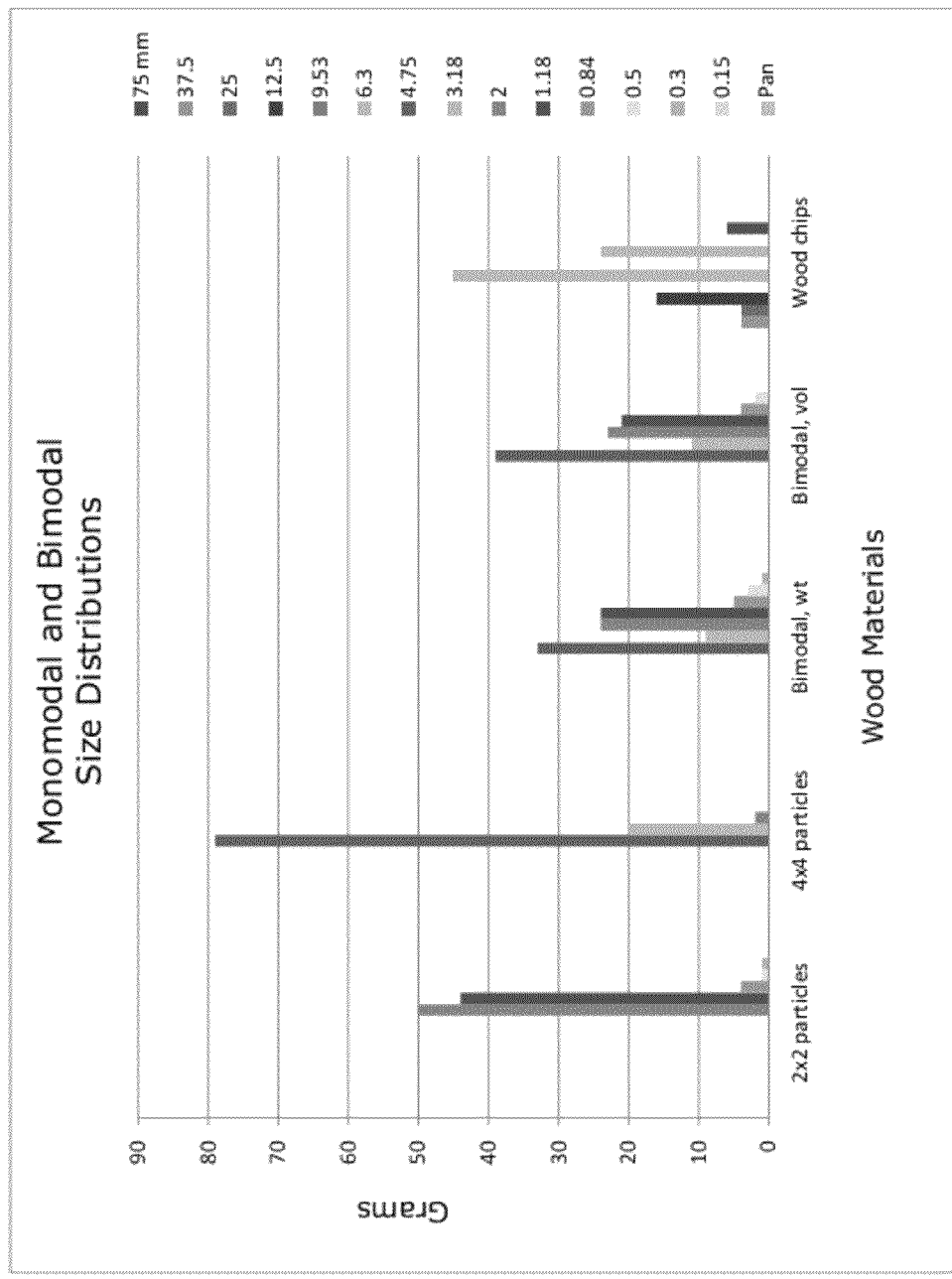
FIG. 3 is a bar graph which illustrates the monomodal and bimodal size distributions of five wood materials used in the bulk density experiments described in the Examples.

FIG. 3 is a bar graph of the Table 2 data which illustrates the monomodal and bimodal size distributions of the five wood materials used in the following bulk density determinations.

Bulk density was determined using a Swedish Standards Institute protocol (Technical Specification SIS-CEN/TS 15103.2006, Solid Biofuels: Methods for determination of bulk density, March 2006), which is incorporated by reference in its entirety herein. In summary, the protocol has five steps:

a) Fill a cylindrically shaped container (in this case, 6⅜" diameter, 4,599 cc container volume and 491.2 g tare weight) by pouring the sample material from a height of 12" above the upper rim until a cone of maximum possible height is formed.

b) The filled container is then shock exposed to allow settling. This is done by dropping it freely from 6" height onto a wooden board which is lying on an even, horizontal and hard floor. Repeat the shock exposure two more times. Then refill the resulting empty space in the container according to step a).

c) Remove surplus material by using a small scantling (here, a rectangle of sheet metal was used), which is shuffled over the container's edge in oscillating movements to remove extra particles.

d) Weigh the filled container (for calculation below).

e) Unify the used sample with the unused sample material and repeat the procedure from a) to d) twice in order to get three replications.

Then calculate the bulk density (here, uncorrected for moisture content) of the sample according to the following equation:

Bulk Density=(filled container weight−tare weight)/
container volume.

Results

Figure 4:
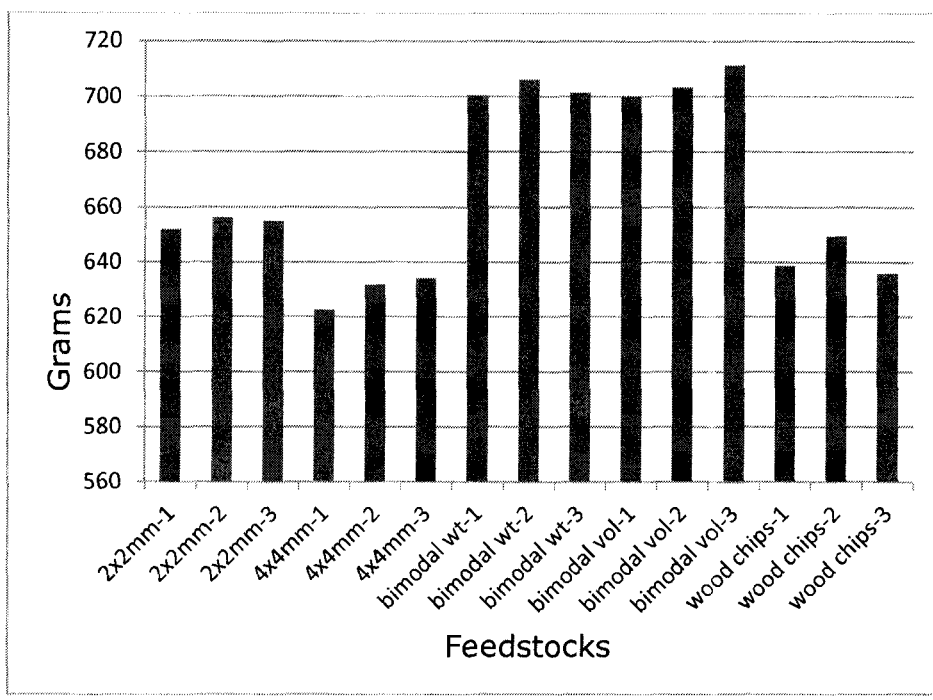
FIG. 4 shows comparative raw data from the bulk density experiments described in the Examples.

The resulting bulk density data is shown in Table 3; and the (filled container weight minus tare weight)" data are plotted in FIG. 4.

TABLE 3

| Wood material | Filled container weight (g) | Tare weight (g) | Filled container weight minus tare weight (g) | Container volume (mm³) | Bulk Density (g/mm³) | Bulk Density, Mean (kg/m³) |
|---|---|---|---|---|---|---|
| 2 × 2 mm-1 | 1143.1 | 491.2 | 651.9 | 4599 | 0.1417 | 144 |
| 2 × 2 mm-2 | 1147.6 | 491.2 | 656.4 | 4599 | 0.1427 | |
| 2 × 2 mm-3 | 1146.2 | 491.2 | 655.0 | 4599 | 0.1470 | |
| 4 × 4 mm-1 | 1113.9 | 491.2 | 622.7 | 4599 | 0.1353 | 137 |
| 4 × 4 mm-2 | 1123.1 | 491.2 | 631.9 | 4599 | 0.1373 | |
| 4 × 4 mm-3 | 1125.4 | 491.2 | 634.2 | 4599 | 0.1378 | |
| Bimodal wt-1 | 1191.4 | 491.2 | 700.2 | 4599 | 0.1523 | 153 |
| Bimodal wt-2 | 1197.4 | 491.2 | 706.2 | 4599 | 0.1536 | |
| Bimodal wt-3 | 1192.6 | 491.2 | 701.4 | 4599 | 0.1525 | |
| Bimodal vol-1 | 1191.2 | 491.2 | 700.0 | 4599 | 0.1522 | 153 |
| Bimodal vol-2 | 1194.6 | 491.2 | 703.4 | 4599 | 0.1529 | |
| Bimodal vol-3 | 1202.6 | 491.2 | 711.4 | 4599 | 0.1547 | |
| Chips-1 | 1130.0 | 491.2 | 638 | 4599 | 0.1387 | 139 |
| Chips-2 | 1140.7 | 491.2 | 648.7 | 4599 | 0.1411 | |
| Chips-3 | 1127.1 | 491.2 | 635.1 | 4599 | 0.1381 | |

Referring to this bulk density data, the bimodal wood particle mixtures exhibited consistently higher bulk densities than the monomeric wood materials.

Discussion

A major benefit that accrues from this new class of plant biomass feedstock particles is the significant increase in bulk density for shipping and storage. As we have observed that two sufficiently separate particle sizes blended together increase bulk density over the individual bulk densities, an optimized packaging for shipment scheme can be created. For example, more material of a blended 2 mm and 4 mm particle mixture can be packaged in a container than either 2 mm or 4 mm alone. With such sufficient size separation the end user or receiver of the material can simply run a single pass, single deck screen to re-fractionate the particles. The utility of this procedure can be seen in long haul shipments where one or more geographically close users want two or more particle sizes. The desired particles can be blended at point of manufacture to decrease each monomeric feedstocks' long-haul shipping costs before re-fractionated near or at the final destination.

In the case of drying, bimodal blends of particles can be routinely separated after drying by an air separator or vibratory screen set. This enables a designer and operator to benefit from intelligent blending for processing and drying, then re-separating for subsequent uses, markets, or processes.

Moreover, new engineering and design opportunities arise when the particles' consistent piece size and shape uniformity, high skeletal surface area, and good flow properties are complemented and enhanced by admixture into bimodal and multimodal biofuel feedstocks.

For example, a controlled distribution of particle sizes is important in pellet manufacture to minimize the pelleting energy and assure pellet durability. Compression of smaller particles that occupy void spaces between larger particles increases the particle-to-particle surface contact area and thus surface chemical bonding. A pellet of all one-size particles is likely to be less durable than a blended-content pellet. Today, pellet mills dry wood chips and then hammer-mill them to a nominal screen size. Gross overs and fines are removed by screening. The remaining broad distribution of particles is pressed through dies to make pellets. Using our bimodal or multimodal particles, a process engineer can optimize pellet composition by specifying particle sizes that further minimize pellet-making energy and still achieve industry standards for durability.

When wood particles are converted to biofuels via pyrolysis, the relative yields of oil and char are a function of particle size and reactor type, the combination of which establish the pyrolysis time. In general, when the time is less than 0.5 seconds, most biomass is converted to bio-oil. When the time is more than 2 seconds, more of the biomass is converted to char. Tuning a pyrolysis system is very difficult when the feedstock has a wide range of particle shapes and thicknesses. Our cooperators have demonstrated that highly uniform feedstocks such as our Crumbles® particles are much easier to process since their reaction rates are predictable. Thus, a facility that desires to produce enough heat and bio-oil to meet that product demand while concurrently producing economically attractive quantities of char can feed a blend of large slow-reacting and small fast-reacting particles to their pyrolysis unit.

Similar opportunities exist for gasifiers where the gas composition is partly a function of particle geometry and size. A process engineer who knows the kinetics and reaction products of each of a range of precision biomass particles can design a feedstock blend that produces an optimal gas output composition.

In the biochemical processing arena, whether the objective being production of biofuels or bioproducts, the flow rate through a packed bed reactor is very sensitive to particle size distribution as well as to nominal particle size. Two important engineering properties of packed beds are the volumetric flow rate and the back pressure, which are generally related and tightly coupled. However, by knowing the effects of carefully controlled particle mixtures the two terms may be mostly decoupled. Also, control of particle blends can be used to restrict flow channeling within a packed bed that may occur with single-size particle beds.

The same issues for liquid fluidic processing exist for packed bed drying and gasification (as noted earlier). A shallow packed bed dryer that is perhaps 1 meter deep is likely to have too much velocity through the bed at larger particle sizes. High velocity consumes blower energy and may waste drying heat through exhausts. A bimodal or multimodal blend of uniform particle feedstocks can be designed to achieve optimal residence times and velocities for the drying air as it passes through a bed of any depth.

Similar to the packed bed drying situation described above, multimodal particle sets can be utilized to create precision bio-filters. The same flow control principles apply, but with the purpose of either slowing hydraulic flows for particulate absorption or decreasing restriction for increased flow. One such application is storm water runoff filtration where the main flow is filtered through a slow multi particle size filter unit that has an automatic overrun high flow bypass for extreme events.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A feedstock comprising particles of one or more plant biomass materials having fibers aligned in a grain, wherein the particles are individually characterized by having a length dimension (L) aligned substantially parallel to the grain, a width dimension (W) normal to L and aligned cross grain, and a height dimension (H) normal to W and L, wherein the L×H dimensions define a pair of substantially parallel side surfaces characterized by substantially intact longitudinally arrayed fibers, the W×H dimensions define a pair of substantially parallel end surfaces characterized by crosscut fibers and end checking between fibers, and the L×W dimensions define a pair of substantially parallel top and bottom surfaces, and wherein the particles in the feedstock are collectively characterized by having a bimodal or multimodal size distribution.

2. The feedstock of claim 1, wherein L is aligned within 10° parallel to the grain.

3. The feedstock of claim 1, wherein L is aligned within 30° parallel to the grain.

4. The feedstock of claim 1, wherein L/H is 4:1 or less and wherein the top and bottom surfaces are characterized by surface checking between longitudinally arrayed fibers.

5. The feedstock of claim 1, wherein H does not exceed a maximum from 1 to 16 mm, W is between 1 mm and 1.5× the maximum H, and L is between 0.5 and 20× the maximum H.

6. The feedstock of claim 1, wherein L is between 4 and 70 mm, and each of W and H is equal to or less than L.

7. The feedstock of claim 1, characterized by size such that at least 80% of the particles pass through a ½ inch screen having a 12.5 mm nominal sieve opening but are retained by a No. 35 screen having a 0.5 mm nominal sieve opening.

8. The feedstock of claim 1, wherein the particles are characterized by having a bimodal or multimodal size distribution as determined by the following protocol:
   drying a random 1000 g sample of the particles to constant weight at 110° F.;
   pouring 400 g of the dried particles into a stacked screen assembly consisting of in contiguous size-ordered array:
      a top 1-inch screen having 25 mm nominal sieve openings,
      a ½-inch screen having 12.5 mm nominal sieve openings,
      a ¼-inch screen having 6.3 mm nominal sieve openings,
      a No. 4 screen having 4.75 mm nominal sieve openings,
      a ⅛-inch screen having 3.18 mm nominal sieve openings,
      a No. 10 screen having 2.0 mm nominal sieve openings
      a No. 20 screen having 0.85 mm nominal sieve openings
      a No. 35 screen having a 0.5 mm nominal sieve openings, and
      a bottom pan;
   shaking the stacked screen assembly for 10 minutes on a motorized tapping sieve shaker;
   weighing the particles that are retained on each of the screens;
   preparing a graphical representation of the relationship between screen size on the x-axis and retained weight per screen size on the y-axis; and
   determining that the particles are characterized by having a bimodal or multimodal size distribution if the graphical representation has two or more relatively distinct peaks.

9. The feedstock of claim 1, wherein the plant biomass is selected from among wood, agricultural crop residues, plantation grasses, hemp, bagasse, and bamboo.

10. The feedstock of claim 9, wherein the wood is a veneer.

\* \* \* \* \*